Patented Feb. 23, 1943

2,311,754

UNITED STATES PATENT OFFICE 2,311,754

MANUFACTURE OF ANILIDES

George Francis Howard and Arthur Howard Knight, Blackley, Manchester, England, assignors to Imperial Chemical Industries Limited, a corporation of Great Britain No Drawing. Application April 17, 1940, Serial No. 330,208. In Great Britain May 22, 1939

3 Claims. (Cl. 260—562)

This invention relates to the preparation of new symmetrical anilides of the general formula

in which $C_6H_4$ stands for phenylene, R stands for a substituent chosen from the group consisting of alkyl, alkoxyalkyl, cycloalkyl, aralkyl and aryl, and the phenylene groups and groups represented by R may carry substituents chosen from the group which consists of chlorine, bromine, methyl, methoxy and ethoxy.

According to the invention we make the anilides by acylating two moles of a substituted nitroaniline of general formula $RNH.C_6H_4NO_2$, where R stands for the same as before and the phenyl group may be substituted as already shown, with one mole of a dihalide of adipic acid and then reducing the adipic di-(nitro-N-substituted-anilide) to the corresponding diamine.

The adipic acid dihalide may be used as such as a starting material or it may be generated in situ from adipic acid and a halide of the type used for converting carboxylic acids to their halides. Since the chloride of adipic acid is the most readily obtained halide, it is the preferred one to use and is quite effective. The chloride can be readily generated in situ from adipic acid and phosphorus trichloride, or thionyl chloride in an inert non-hydroxylic solvent such as benzene or toluene. Reduction of the adipic di-(nitro-N-substituted-anilide) is effected readily. One convenient way of reduction is heating with iron in solution in a mixture of water and alcohol in the presence of a small amount of acid.

Another convenient way is by heating in methyl or ethyl alcohol with hydrogen under a pressure of about 100 atmospheres and at a temperature of 60–100° C. in the presence of a Raney nickel catalyst.

Adipic acid is a readily available acid and since the process of the invention takes place readily and with good yield, a very good means is afforded of obtaining dianilides containing a chain of methylene groups. The anilides are valuable intermediates for the manufacture of dyes.

The following examples, in which parts are by weight, illustrate but do not limit the invention.

Example 1

A mixture of 14.6 parts of adipic acid, 33.2 parts of 4-nitro-1-N-ethylaniline, 12.4 parts of phosphorus trichloride and 250 parts of dry toluene is heated at the boil under reflux with good stirring for 18-20 hours. The toluene is then removed by distillation in steam. The residual aqueous mixture is then made alkaline with sodium carbonate. The crude adipic di-(4-nitro-1-N-ethylanilide) thus obtained as an aqueous suspension is filtered off and dried. It melts at 180° C. It is purified by lixiviation with acetone or crystallisation from ethoxyethyl alcohol whereby it is obtained as a pale yellow material having M. P. 198–9° C. The yield of purified material is 34 parts.

A mixture of 440 parts of industrial ethyl alcohol, 8 parts of 36% hydrochloric acid and 66 parts of iron filings is heated at the boil with stirring for 10 minutes. 44 parts of adipic di-(4-nitro-1-N-ethylanilide) are added in small portions over half an hour and the mixture boiled under reflux for a further 18 hours. 10 parts of anhydrous sodium carbonate are then added and the mixture filtered. The residual iron sludge is reextracted with 66 parts of hot industrial ethyl alcohol, filtered and the filtrates combined. The ethyl alcohol is removed by evaporation and the residual oil cooled until it solidifies. Yield of crude adipic di-(4-amino-1-N-ethylanilide)=30 parts, M. P. 80–86°. It is purified by digesting with hot petroleum ether (B. P. range 80–100° C.) and refiltering, yield 27 parts, M. P. 139° C.

Example 2

To a solution at 115–120° C. of 33.2 parts of 4-nitro-1-N-ethylaniline in 180 parts of dry toluene there is added in half an hour with stirring a solution of 18.3 parts of adipyl chloride in 15 parts of dry toluene. The mixture is boiled under reflux for 18–20 hours. The toluene is then removed from the reaction product by distillation in steam and the aqueous residue made alkaline to litmus with sodium carbonate. The solid adipic di-(4-nitro-1-N-ethylanilide) is then filtered off and dried. 37 parts are obtained having M. P. 187–8° C. After recrystallisation from 250 parts of ethoxyethyl alcohol, 36.6 parts are obtained, M. P. 198–9° C.

The reduction and isolation are carried out as in Example 1, and the same compound obtained.

Example 3

A mixture of 14.6 parts of adipic acid, 44 parts of 4-nitro-1-N-cyclohexylaniline, 12.4 parts of phosphorus trichloride and 250 parts of dry toluene is boiled under reflux with good stirring for 18–20 hours. The toluene is then removed from the reaction product by distillation in steam.

The residue is then made alkaline with sodium carbonate and stirred with cooling until the crude adipic di-(4-nitro-1-N-hexylanilide) solidifies. The solid is then filtered off and dried. It is purified by recrystallisation from glacial acetic acid. Yield 40 parts, M. P. 128–135° C.

A mixture of 70 parts of iron filings, 2 parts of 36% hydrochloric acid, 250 parts of water and 200 parts of butyl alcohol is boiled under reflux with stirring for 10 minutes. To the stirred mixture there are then added in portions 55 parts of adipic di-(4-nitro-1-N-cyclohexylanilide) and boiling is continued for 15–20 hours. 2 parts of anhydrous sodium carbonate are then added. After cooling to room temperature the reaction mixture is filtered. The residual iron sludge is extracted with 300 parts of hot butyl alcohol, filtered, and the filtrates combined. The butyl alcohol is then removed by distillation in steam and the residual aqueous suspension of crude adipic di-(4-amino-1-N-cyclohexylanilide) is made just acid to Congo red paper with hydrochloric acid. The resulting solution of the diamine hydrochloride is then treated with 10 parts of animal charcoal, the mixture filtered hot, 5 parts of sodium acetate crystals added to the filtrate and the diamine precipitated by the gradual addition of a slight excess of an alkali (e. g. ammonia). The solid so-obtained is filtered off and dried at 50–60° C. The yield of adipic di-(4-amino-1-N-cyclohexylanilide) is 40 parts, M. P. 218–220° C. It forms a light greyish powder.

Example 4

To a solution at 115–120° C. of 48.4 parts of 4-nitro-2-N-benzyltoluidine in 300 parts of dry toluene there is added over half an hour, with stirring, a solution of 18.3 parts of adipyl chloride in 20 parts of dry toluene. The mixture is boiled and stirred under reflux for 18–20 hours. 100 parts of water are then added to the reaction product, after cooling to 100° C. and the toluene then removed by distillation in steam. The residual aqueous suspension is then made alkaline to litmus with sodium carbonate. The aqueous liquor is removed by decantation and the tarry residue washed several times with water. It is purified by boiling with 300 parts of ethyl alcohol for 15–30 minutes. The solid is then filtered from the hot mother liquor. The yield of adipic di-(4-nitro-2-N-benzyltoluidide) so-obtained is 45 parts M. P. 176–8° C.

A mixture of 500 parts of ethyl alcohol, 40 parts of iron filings, 5 parts of 36% hydrochloric acid and 41 parts of adipic di-(4-nitro-2-N-benzyltoluidide) is boiled under reflux with stirring for 16–20 hours. 7 parts of anhydrous sodium carbonate are then added and the mixture filtered. The residual iron sludge is re-extracted with 100 parts of hot ethyl alcohol, the extract filtered and the filtrates combined. The ethyl alcohol is removed by evaporation and the gummy residue is dissolved in 600 parts of water containing sufficient hydrochloric acid to give an acid reaction to Congo red paper (about 16–17 parts of 36% acid). 6 parts of animal charcoal are added to the solution, the mixture heated to the boil and then filtered. The filtrate is cooled to 10–15° C. and adipic di-(4-amino-2-N-benzyltoluidide) is precipitated by the cautious addition of excess sodium acetate. The new diamine is filtered off, washed with water and dried at 50–60° C. Yield 33 parts. M. P. 156° C.

Example 5

A mixture of 14.6 parts of adipic acid, 48.4 parts of 4-nitro-2-N-benzyltoluidide, 12.4 parts of phosphorus trichloride and 250 parts of toluene is heated at the boil under reflux, with stirring, for 18–20 hours. The toluene is then removed by distillation in steam and the residual aqueous mixture made alkaline with sodium carbonate. After cooling to room temperature the crude adipic di-(4-nitro-2-N-benzyltoluidide) is filtered off and dried. Yield 52 parts. M. P. 166–9° C. It can be purified by recrystallisation from alcohol (M. P. of pure compound, 176° C.).

52 parts of adipic di-(4-nitro-2-N-benzyltoluidide) are added in portions to a mixture of 50 parts of iron filings, 100 parts of water, 150 parts of butyl alcohol and 1 part of 36% hydrochloric acid which is stirred at the boil under reflux. Boiling is continued for a further 18 hours. 2 parts of anhydrous sodium carbonate are then added and the mixture filtered. The residual iron sludge is digested with a further 100 parts of hot butyl alcohol, the mixture filtered, and the two filtrates combined. Butyl alcohol is removed from the latter by distillation in steam. The residual aqueous suspension of crude adipic di-(4-amino-2-N-benzyltoluidide) is then rendered just acid to Congo red paper by the addition of hydrochloric acid, with stirring. The resulting solution of the dihydrochloride of the diamine is then treated at 80–100° C. with 10 parts of animal charcoal and the mixture filtered. 5 parts of sodium acetate crystals are then added to the cooled filtrate and the diamine is reprecipitated by the gradual addition of a slight excess of an alkali (e. g. ammonia). The solid is filtered off and dried at 50–60° C. Yield 42 parts of adipic di-(4-amino-2-N-benzyltoluidide). M. P. 152–6° C. The pure diamine melts at 156° C.

Example 6

In Example 1 instead of 33.2 parts of 4-nitro-1-N-ethylaniline there are used 43 parts of 4-nitrodiphenylamine. The adipic di-(4-nitro-1-N-phenylanilide) so-obtained has M. P. 195–6° C. after recrystallisation from glacial acetic acid (yield 47 parts), and the adipic di-(4-amino-1-N-phenylanilide) obtained by the reduction of the latter has M. P. 197–8° C. (yield 40 parts).

Example 7

A mixture of 18.3 parts of adipic acid, 69.1 parts of 4-nitro-2-N-p-chlorobenzyltoluidine, 300 parts of dry toluene and 16.1 parts of phosphorus trichloride are heated with good stirring under reflux for 18–20 hours. After removal of the toluene by steam distillation the condensation product is boiled with an excess of methyl alcohol. The insoluble residue of adipic di-(4-nitro-2-N-p-chlorobenzyltoluidide) has M. P. 235–240° C. (with some decomposition). Yield 75%. The reduction of the dinitro compound is carried out as in Example 3.

Example 8

A mixture of 18.3 parts of adipic acid, 57 parts of 4-nitro-1-N-benzylaniline, 300 parts of dry toluene and 16.1 parts of phosphorus trichloride is treated as in Example 7. The adipic di-(4-nitro-1-N-benzylanilide) so-obtained (65 parts) has M. P. 158–9° C. A mixture of 65 parts of adipic di-(4-nitro-1-N-benzylanilide), 125 parts of iron filings, 300 parts of water, 300 parts of butyl alcohol and 5 parts of 36% hydrochloric acid is boiled under reflux with stirring for 18-20 hours. The reduction mixture is then made alkaline to litmus by adding sodium carbonate or ammonia, the iron sludge filtered off and the filtrate steam distilled to remove the butyl alcohol. The crude adipic di-(4-amino-1-N-benzylanilide) is filtered off and purified by lixiviation with dilute hydrochloric acid in which the diamine is insoluble. The purified diamine so-obtained has M. P. 172-174° C. (yield 52 parts).

If in the above process instead of 4-nitro-1-N-benzylaniline there is used 3-nitro-1-N-benzylaniline, the dinitro compound so-obtained has M. P. 120-121° C., (yield 65 parts) and the adipic di-(3-amino-1-N-benzylanilide) obtained after reduction of the latter has M. P. 170° C. (yield 50 parts).

Adipic di-(2-nitro-1-N-benzylanilide) (M. P. 122° C.) and adipic di-(2-amino-1-N-benzylanilide) (M. P. 198-200° C.) are obtained in a similar way starting from 2-nitro-1-N-benzylaniline.

*Example 9*

In Example 8 instead of 57 parts of 4-nitro-1-N-benzylaniline there are used 64.5 parts of 4-nitro-2-N-benzylanisidine. The adipic di-(4-nitro-2-N-benzylanisidide) obtained (yield 60 parts) has M. P. 157-157.5° C. and the adipic di-(4-amino-2-N-benzylanisidide) obtained by reduction of 60 parts of the latter has M. P. 164-165° C. (yield 50 parts).

Adipic di-(5-nitro-2-N-benzylanisidide) and adipic di-(5-amino-2-N-benzylaniside) are prepared in a similar way starting from 5-nitro-2-benzylanisidine.

*Example 10*

In Example 1, instead of 33.2 parts of 4-nitro-1-N-ethylaniline there are employed 38.8 parts of 4-nitro-1-N-n-butylaniline. There are obtained 42 parts of adipic di-(4-nitro-1-N-n-butylanilide) (M. P. 148-9° C. ex dilute acetic acid) and 26 parts of adipic di-(4-amino-1-N-n-butylanilide) (M. P. 121° C., after crystallisation from ethyl alcohol).

*Example 11*

In Example 1, instead of 12.4 parts of phosphorus trichloride, there are used 23.8 parts of thionyl chloride. After working up the reaction product as described in Example 1 there are obtained 38.5 parts of adipic di-(4-nitro-1-N-ethylanilide). Reduction of this amount of dinitro compound by the method of Example 1 (using proportionately smaller quantities of reactants) gives 29 parts of adipic di-(4-amino-1-N-ethylanilide) (M. P. 140° C. after purification by crystallisation from ethanol and drying at 60-70° C. in air).

We claim:

1. A symmetrical adipic-di-(amino - N - substituted anilide represented by the formula

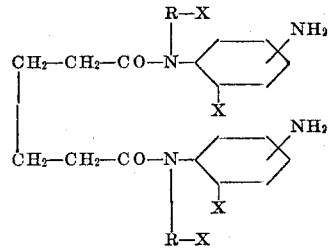

wherein each R is the nucleus of one of a group consisting of phenyl and benzyl and each X is one of a group consisting of hydrogen, chloro, bromo, methyl, methoxy and ethoxy.

2. Adipic di-(4-amino-2-N-benzyltoluidide).
3. Adipic di-(3-amino-1-N-benzylanilide).

GEORGE FRANCIS HOWARD.
ARTHUR HOWARD KNIGHT.